(12) United States Patent
Ackley

(10) Patent No.: US 8,060,072 B2
(45) Date of Patent: Nov. 15, 2011

(54) REROUTING COMMUNICATIONS TO PROVIDE CELL PHONE PARENTAL CONTROL

(75) Inventor: Jonathan Ackley, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 785 days.

(21) Appl. No.: 11/983,565

(22) Filed: Nov. 9, 2007

(65) Prior Publication Data

US 2008/0064381 A1 Mar. 13, 2008

Related U.S. Application Data

(62) Division of application No. 10/951,955, filed on Sep. 27, 2004, now Pat. No. 7,302,272.

(60) Provisional application No. 60/481,428, filed on Sep. 26, 2003.

(51) Int. Cl.
*H04M 3/42* (2006.01)

(52) U.S. Cl. .................. 455/417; 455/412.2; 455/414.1; 455/415

(58) Field of Classification Search .......... 455/410–415, 455/432.3–435.1
See application file for complete search history.

(56) References Cited

U.S. PATENT DOCUMENTS

| | | | |
|---|---|---|---|
| 5,802,157 | A | 9/1998 | Clarke |
| 6,246,756 | B1 | 6/2001 | Borland et al. |
| 6,298,239 | B1 | 10/2001 | Yonemoto et al. |
| 6,564,047 | B1 | 5/2003 | Steele et al. |
| 2002/0084888 | A1 | 7/2002 | Jin |
| 2003/0233651 | A1 | 12/2003 | Farley |
| 2004/0166878 | A1 | 2/2004 | Erskine et al. |
| 2005/0027830 | A1* | 2/2005 | Florkey et al. ............... 709/220 |
| 2006/0212600 | A1 | 9/2006 | Hee Jin |

FOREIGN PATENT DOCUMENTS

| | | |
|---|---|---|
| EP | 1280367 | 1/2003 |
| FR | 2828975 | 2/2003 |
| JP | 5160917 A | 6/1993 |
| JP | 2002009964 A | 1/2002 |
| JP | 2002077438 A | 3/2002 |
| JP | 2002290540 A | 10/2002 |
| JP | 2002335329 A | 11/2002 |
| JP | 2003134231 A | 5/2003 |
| KR | 2002-0026050 | 4/2002 |
| KR | 2002-0050536 | 6/2002 |
| WO | WO 02/058414 A | 7/2002 |
| WO | WO 03/049347 | 6/2003 |
| WO | WO 03/055215 | 7/2003 |
| WO | WO 03/065150 | 8/2003 |
| WO | WO 03/075561 | 9/2003 |

* cited by examiner

*Primary Examiner* — Dai A Phuong
(74) *Attorney, Agent, or Firm* — Farjami & Farjami LLP

(57) ABSTRACT

A method for allowing remote control of the usage of a networked wireless device including incoming communications, outgoing communications, and application launching. Controlling entities, such as parent cellular telephones or web sites, are provided with the ability to select a list of approved anytime incoming communications, or approved incoming and outgoing communications based on time and day. Incoming communications include text messaging and telephone calls. Further, the controlling entity is provided with the ability to reroute to the controlling entity any usage of the wireless device such as incoming communications, outgoing communications, and application launching. Access to usage logs of the wireless device is provided to the controlling entity.

8 Claims, 6 Drawing Sheets

REROUTING COMMUNICATIONS TO PROVIDE CELL PHONE PARENTAL CONTROL

RELATED APPLICATIONS

This application is a divisional of U.S. application Ser. No. 10/951,955, filed Sep. 27, 2004, now U.S. Pat. No. 7,302,272 which claims the benefit of U.S. Provisional Application No. 60/481,428, filed Sep. 26, 2003, the content of which is incorporated by reference in its entirety.

BACKGROUND OF THE DISCLOSURE

1. Field of the Disclosure

The present disclosure relates to communication systems and methods with monitoring and control functions. In particular, it relates to communication systems with parental control and supervision of a child's wireless device usage.

2. State of the Art

There are several concerns preventing parents from purchasing cellular telephones for their children. One concern is that the child will abuse her calling privileges by calling accidentally or inappropriately resulting in high bills. Another important concern is that an stranger adult may attempt to contact the child though her cellular telephone without the knowledge and consent of the parent. The natural fear is the stranger may be kidnapper or abuser. A further concern is that the child will lose or misplace the handheld telephone device. An unauthorized user could potentially benefit from gratuitous telephone calls that the parent will have to ultimately pay.

Modern cellular telephones offer games and other entertainment applications. Parents may be hesitant to provide portable game platforms to children as the games might prove distracting during other activities.

Some cellular telephones are equipped with ground positioning system (GPS) microcontrollers providing information about the location of the cellular phone. GPS services might be used to help safeguard children, but currently the handsets are too expensive for mass-market consumption.

There are applications whereby a parent may specify a cap on the amount an account can spend per month. There are also systems that allow parents to program telephone numbers and universal remote locator (URL) links as forbidden or restricted call destinations.

While these systems provide a useful manner for controlling cellular phones, they generally present limitations that have not been addressed until now. The first and most impacting limitation is the inability of the current systems to allow the parent to control the incoming phone calls. Parent may wish to limit incoming phone calls of adult strangers to protect their children from being victims of criminal activity, to limit the distractions she gets from friends such as invitations to play games on the internet, to alleviate a child from telemarketers interruptions, or to simply reduce the total usage time of the child.

A second limitation of current systems is that they do not allow for a time-based control of telephone applications and calls. While previous systems provided parents with the ability of restricting a number to call, for instance, they did not provide parents with the ability to restrict those numbers for particular periods of time. A third limitation of current systems is that they do not allow parents to access the call history of the child's telephone from the parents hand held device. A fourth limitation is that parents do not have the means to reroute phone calls to their telephones based on certain criteria of the incoming call number or based on the time the call is made. Finally, yet another limitation is that current systems do not allow for parent to schedule events on their children's phones such as setting reminding messages for the child.

SUMMARY OF THE DISCLOSURE

A system and method for controlling usage of a wireless device, such as a personal data assistant (PDA) or a cellular telephone is disclosed. Usage of the wireless device encompasses outgoing and incoming communication as well as application usage. Outgoing or incoming communications may include electronic email, telephone calls, text messaging, universal resource locator (URL) requests, etc. A controlling device is provided with software that allows it to control usage of the wireless device. The controlling device is, for instance, a telephone, PDA, or personal computer comprising an application which provides a way to control the wireless device. In one embodiment, the application runs on a controlling entity's wireless device. Alternatively, the application may be a web-based application. The system and method may for example be used by a controlling entity such as a parent, to control or manage use of a child's cellular telephone.

In one embodiment, the software in the controlling entity allows the parent to schedule restrictions based on time by identifying periods when the child may make use of the wireless device. For example, calls may be restricted based on time of day, such as during school hours, or day of the week, such as weekdays or weekends. The identified time restrictions are then transmitted to a network database to which the controlled wireless device has access rights. The wireless device is also provided with software that allows it to access the time restrictions in the permission database. Once the information is accessed, the software determines if the current time is within the allowed permitted times. Alternatively, the time restrictions imposed by the controlling entity may also be transmitted directly to the wireless device and stored in permission database residing in the wireless device.

In another embodiment, incoming communication to a wireless device is controlled by a controlling entity. Incoming communication may be controlled based upon an approved list of incoming communication sources. Incoming communication sources include, for example, telephone numbers, SMS addresses, email address, or other addresses. A total restriction may be imposed for receiving incoming calls in the wireless device. The controlling device transmits the forbidden number or name corresponding to the source of the call to the permission database. The permission database may reside in the network or in the wireless device. The wireless device then checks if the data corresponding to the source of the call is qualified in the permission database as a forbidden number. If so, the wireless device rejects an incoming communication attempt from the forbidden source every time it is made.

Furthermore, the operator of the wireless device may request that a particular incoming communication source be approved by the controlling entity. The controlling entity will receive the request and transmit the permission or disallowance to the permission database. The permission database may reside in the network or in the wireless device. The wireless device then checks the permission database and determines whether it has permission to take the incoming call.

The usage of a wireless device may also be rerouted to the controlling device. Usage of the wireless device encompasses outgoing and incoming communication as well as application usage. Once a certain use has been restricted, the software in the wireless device reroutes the use to the controlling device. For instance, if it receives an incoming phone call, the incoming phone call will be rerouted to the controlling device if it is time-restricted or forbidden. If the wireless device receives an attempt to launch an application, and the application usage is forbidden or restricted at the time of the attempt, the wireless device will forward the attempt to the controlling entity notifying that an attempt to launch the application was made.

In yet another embodiment, a controlling entity is capable of viewing usage information of a wireless device.

BRIEF DESCRIPTION OF THE DRAWINGS

The disclosure will be better understood and objects, other than those set forth above, will become apparent when consideration is given to the following detailed description. Such description makes reference to the accompanying drawings wherein.

DETAILED DESCRIPTION

In the following description, numerous specific details are set forth in order to provide a more thorough disclosure. It will be apparent, however, to one skilled in the art, that the art disclosed may be practiced without these specific details. In some instances, well-known features may have not been described in detail so as not to obscure the art disclosed.

There is at least a method and system to remotely control the usage of a wireless device. Usage of the wireless device includes incoming communication, outgoing communication, and wireless device application usage. A common situation that benefits from the remote control of a wireless device is where parents want to control their children's usage of wireless devices.

Communication Between Devices

Figure 1:
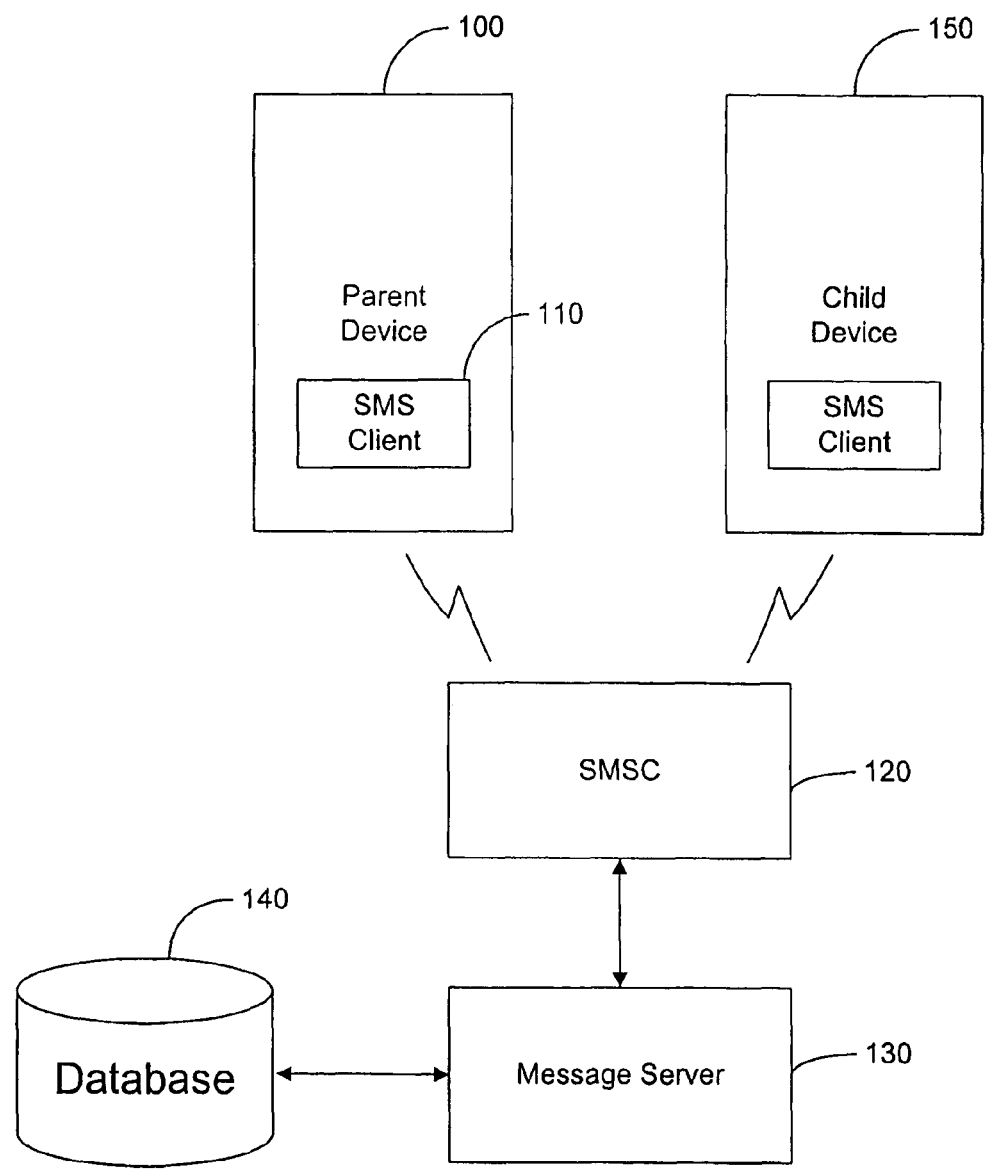
FIG. 1 shows a component diagram of a parental control system in an illustrative embodiment incorporating features of the present disclosure.

The present disclosure is enabled by a system of communication between the controlling device (e.g. parent device) and the wireless device (e.g. child device). In one embodiment, as shown in FIG. 1, a controlling device, namely a parent device 100, sends a controlling message to a child device 150. An SMS client 110 residing on the parent device generates a coded SMS message. The parent device sends the generated SMS message to a hosting SMSC (Short Message Service Center) 120. In turn, the SMSC routes the message to the message server 130. The message contains routing and destination information. The message server 130 is a program running on a separate computing device. The message server 130 verifies, via a database 140 that the sending entity is authorized to request data from the child device 150. The message server 130 then forwards the message via the SMSC 120 to the child device 150.

An SMS client in the child device 150 examines all incoming SMS messages. When a properly coded SMS message arrives, the SMS sniffer on the child device 130 decides which application the message is requesting. The appropriate application is launched in the child device and passes to that application the appropriate data encoded within the incoming SMS string from the parent device 100.

The client application then examines the request embedded in the SMS string and decides how it should react to the incoming request. This program is configured to access and edit files contained within the handset, including memory cards and other peripherals. Based on the request, the program can modify files, set device attributes or settings. It can also read information stored in the device, collate it and send it back to the parent device 100. If desired, these programs can make themselves visible to the owner of the child device 150 by way of alerts or requests for input.

Control of Incoming Communication

According to one embodiment, the parent device controls the settings for incoming communication to the child device. Incoming communications may constitute phone calls, short message service (SMS) text messages, etc.

Figure 2:
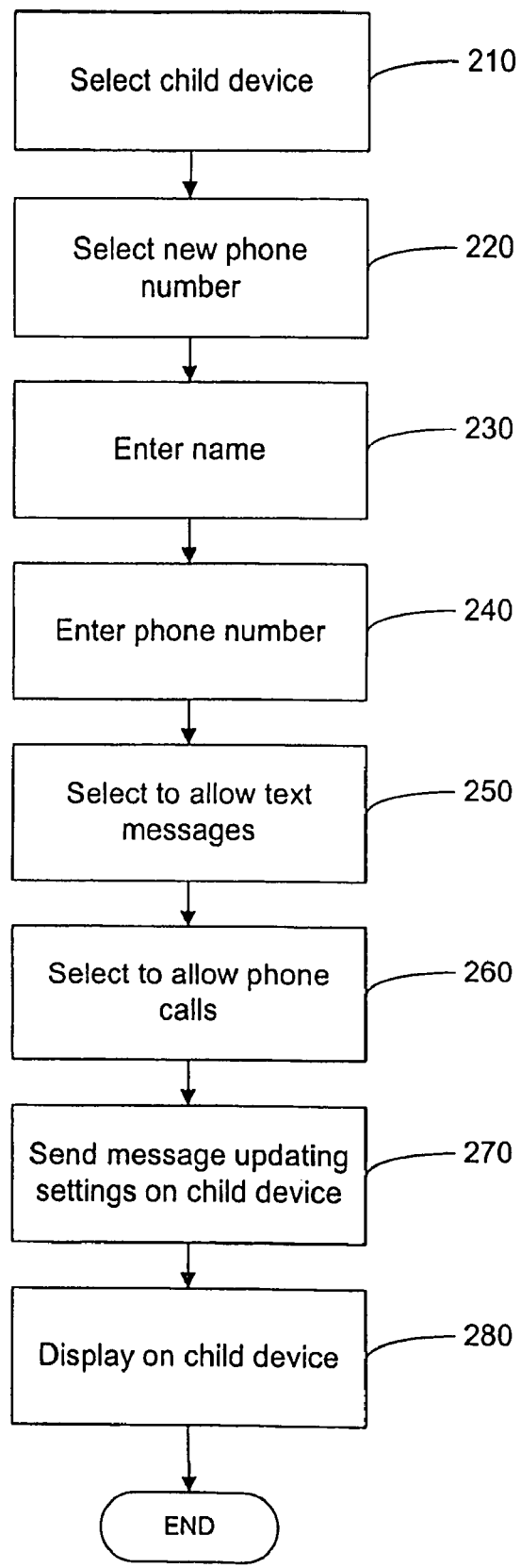
FIG. 2 shows a flow diagram of a parental control system for restricting incoming calls to a wireless device in an illustrative embodiment incorporating features of the present disclosure.

In one embodiment, as shown in FIG. 2, a parent may choose to limit incoming calls to their child by making sure the child may only receive calls at anytime from approved numbers. As way of example, a mother may control what incoming text messages her daughter Amy receives. She may add Sue's telephone number—Amy's best friend—to a list of allowed incoming communications. To do so, the mother selects an icon representing her daughter's device 210 and further selects the option "Add New Phone Number" 220. She then inputs Sue's name 230 and number 240. In addition, she checks options to allow text messages 250 as well as phone calls to be received by Amy's device 260. Subsequently she confirms the settings. An SMS message is sent to Amy's device which adds Sue's telephone number to the list of authorized incoming phone numbers 270. Now Amy can receive text messages from Sue. The parent may also control whether the child device displays a notification that a previously unauthorized incoming number is now authorized 280.

Figure 3:
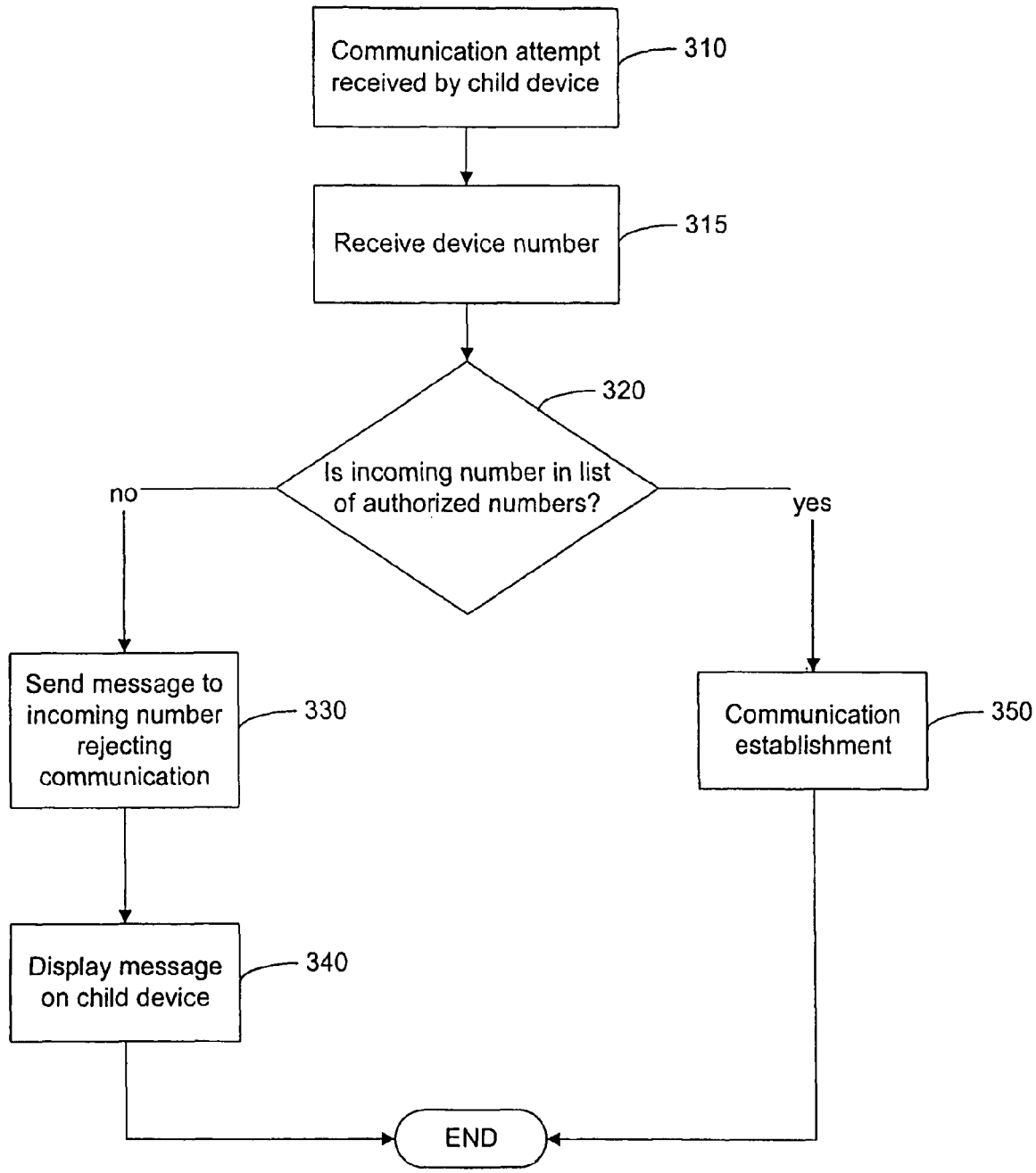
FIG. 3 shows a flow diagram of a parental control system for receiving approved incoming calls to a wireless device in an illustrative embodiment incorporating features of the present disclosure.

In FIG. 3, the child device receives an incoming communication 310. On Amy's handset there is an embedded list or database of authorized incoming numbers. When a communication attempt is received on the child device, an associated phone number is also received with the communication attempt 315. The handset receiver program checks the number received in the list of authorized incoming numbers 320. If the number is in the list (e.g. Sue's number), the communication is received 350. Otherwise the communication is rejected 330. The parent may also control whether the child device displays a notification that an unauthorized incoming communication attempt has been rejected 340.

Figure 4:
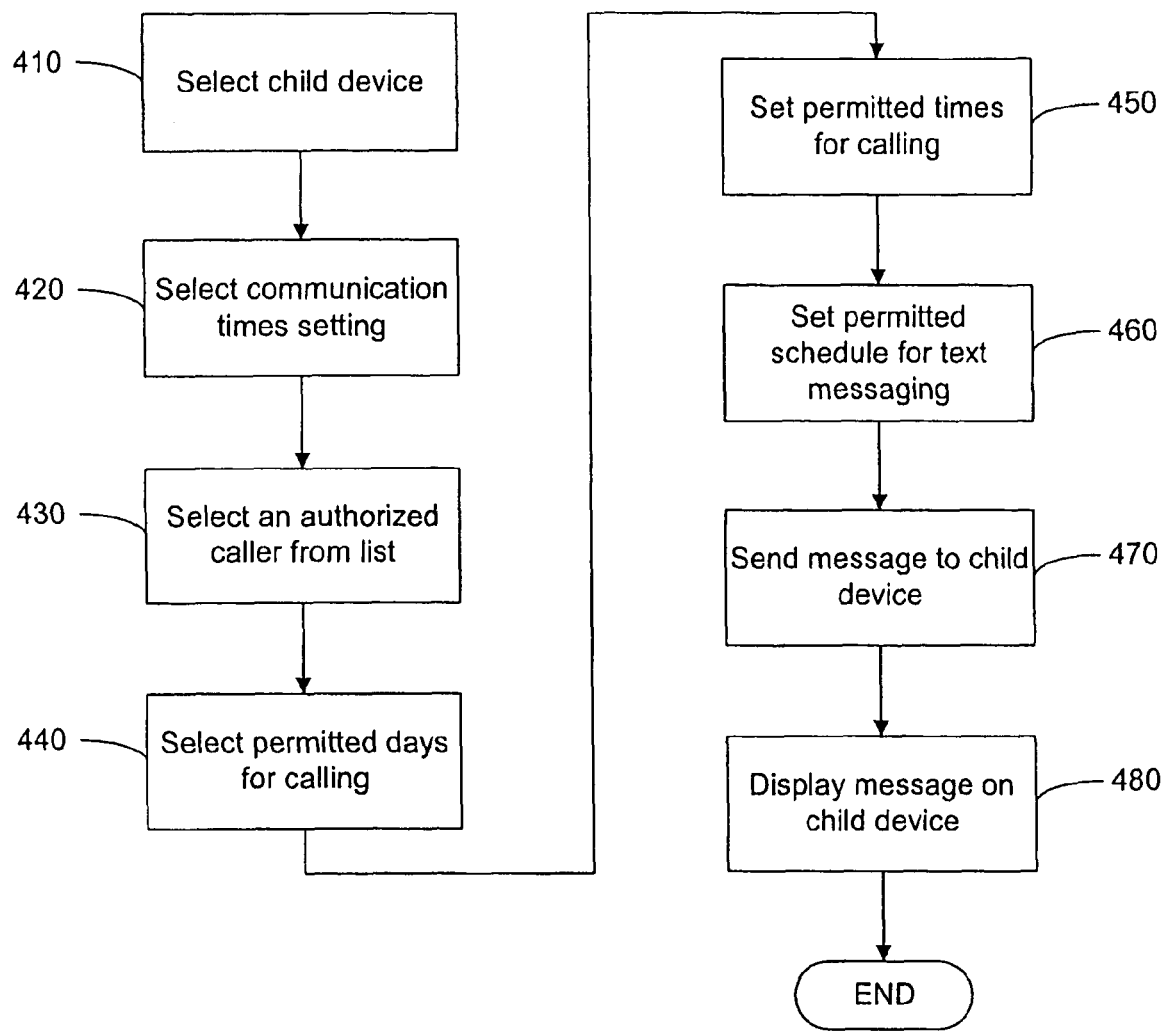
FIG. 4 shows a flow diagram of a parental control system for time restricting a particular use of a wireless device in an illustrative embodiment incorporating features of the present disclosure.

In another embodiment, as shown in FIG. 4, a parent may approve or restrict incoming communication during specified periods of time. For instance, Amy's mother may approve incoming text messaging from Sue only during non-school hours, and further, she may approve incoming phone calls only during the weekends. To do so, the mother selects an icon representing her daughter's device 410 and further selects the option "Set authorized incoming communication times" 420. She then selects from a list of preauthorized phone numbers selecting he daughters' friend Sue 430. The mother the selects the days in the week incoming calls from Sue are permitted 440. Further, she enters the times in the day at which calls may be allowed 450. In addition, she enters a schedule for authorized incoming text messages 460. Subsequently she confirms the settings. An SMS message is sent to Amy's device which sets the incoming call authorized schedule for Sue's telephone number 470. The parent may also control whether the child device displays a notification that a previously authorized incoming number is now time-restricted 480.

Yet, in another embodiment, a parent may approve incoming communication upon the request of the child. In the situation where a child has a telephone number she wants to add to her device as an authorized incoming number, a message is sent to the parent who may then approve or disallow the phone number. The message may be in the form of an SMS message between telephones, be sent to a designated email address, or be displayed on a central administrative web site used by the parents. The parent can then approve or decline to approve the phone number via the parent device. This response is sent back to the child device. The new number is added to the list of authorized calling if it was approved by the parent. For instance Amy's mother may approve incoming telephone calls from Sue after Amy requests permission to receive Sue's device calls.

In another embodiment, a parent may specifically forbid a particular number to ever be received as an incoming communication to the child device. The parent can give the device to a child with the peace of mind that comes from knowing that the child will not be put at risk by allowing the child to communicate with strangers.

In yet another embodiment, a parent may reroute any incoming unauthorized communication with the child device. The communication attempt is rerouted to the parent device or a parent-supervised answering service. Unauthorized communications include specifically forbidden numbers, communications from time-restricted numbers calling outside the window of authorization, unknown numbers, etc.

Figure 5:
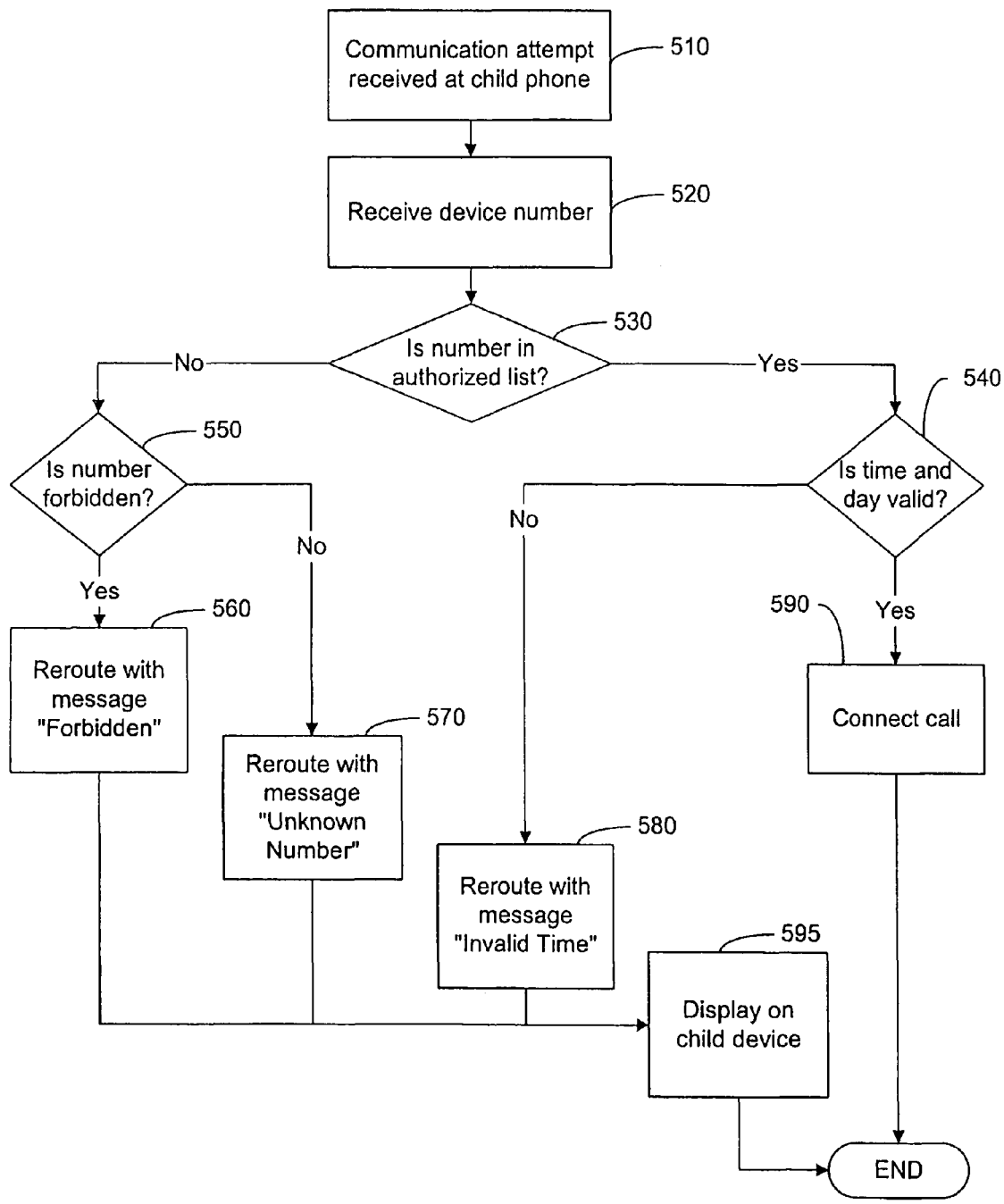
FIG. 5 shows a flow diagram of a parental control system for attempting a particular use that has been time-restricted in wireless device in an illustrative embodiment incorporating features of the present disclosure.

As FIG. 5 demonstrates, when a communication attempt is received on the child device 510, an associated phone number is also received with the communication attempt 520. The handset receiver program checks the number received in the list of authorized incoming numbers. If the number is not in the list 530, or is not an authorized time for receiving the call 540, or is specifically forbidden 550, the communication and a message 560, 570, or 580 is then forwarded to the parent device, provided that the rerouting option is set on the child device. The parent may also control whether the child device displays a notification that an unauthorized incoming communication attempt has been rerouted 595.

In another embodiment, a parent may access a history log of authorized and unauthorized incoming communications. The parent would be able to see incoming phone numbers that were answered, rejected, or rerouted and the corresponding times.

Control of Outgoing Communication

According to one embodiment, the parent device controls the settings for outgoing communication from the child device. Outgoing communications may constitute phone calls, short message service (SMS) text messages, URL requests, etc.

A parent may approve or restrict outgoing communication during specified periods of time. For instance, Amy's mother may approve outgoing text messaging from Amy's friend, Sue, only during non-school hours, and further, she may approve outgoing phone calls only during the weekends. As FIG. 4 shows, the mother selects an icon representing her daughter's device 410 and further selects the option "Set authorized outgoing communication times" 420. She then selects from a list of preauthorized phone numbers selecting he daughters' friend Sue 430. The mother then selects the days in the week outgoing calls to Sue are permitted 440. Further, she enters the times in the day at which calls may be made 450. In addition, she may enter a schedule for authorized outgoing text messages 460. Subsequently she confirms the settings. An SMS message is sent to Amy's device which sets the outgoing call authorized schedule for Sue's telephone number 470. The parent may also control whether the child device displays a notification that a previously authorized outgoing number is now time-restricted 480. Finally, the parent may also control whether the time restriction applies to one phone number in the list or to multiple numbers in the list.

On the child device resides a database containing a list of authorized outgoing numbers. The parent device or web site can add or delete numbers from this list via a messaging system such as SMS. When a phone number is selected on the child device and the child attempts to initiate the call, the handset dialing program checks the current number entered against the list of valid numbers. If it finds the number, the dialing program then checks the time and date at which the dialed number can be called or sent a message. If the current time and date falls within the permitted time and date the child device completes the call. If it does not fall within the permission window, the child device displays an alert indicating that it is not a valid time to call. The parent may also control whether the child device sends a notification to the parent device that an unauthorized outgoing communication attempt has been rejected.

In yet another embodiment, a parent may reroute any outgoing unauthorized communication from the child device. The communication attempt is rerouted to the parent device or a parent-supervised answering service. Unauthorized communications may include specifically forbidden numbers, communications occurring outside the window of authorization, unknown numbers, etc. When a communication attempt originates on the child device, the dialing program checks the number dialed in the list of authorized outgoing numbers. If the number is not in the list, or is not an authorized time for making the call, the communication is then forwarded to the parent device, provided that the rerouting option is set on the child device. The parent may also control whether the child device displays a notification that the unauthorized outgoing communication attempt has been rerouted.

In another embodiment, a parent may access a history log of authorized and unauthorized outgoing communications from the child device. The parent would be able to see outgoing numbers that were connected, rejected, or rerouted and the corresponding times.

In yet another embodiment of controlling outgoing communication, a parent may schedule a communication from the child device to the parent device. For example the parent may schedule a communication from the child device everyday after school is over. The communication could be an SMS message or a phone call. The parent can also sign up to receive wireless alerts on his device when his child has spent a set amount of money making phone calls or messaging.

Control of Applications Usage

According to one embodiment, the parent device controls the settings for usage of applications on the child device such as games.

In another embodiment, a parent may approve or restrict the usage of applications during specified periods of time. The approved times and dates are then associated with these applications. The parent manages the application usage through a communication system such as SMS. The parent can request a list of the current applications available on the child device. Then, from a web or handset interface they may associate the appropriate day, time and recurrence data. This data is then sent to the child handset and stored in the embedded application list which is contained in a database.

Figure 6:
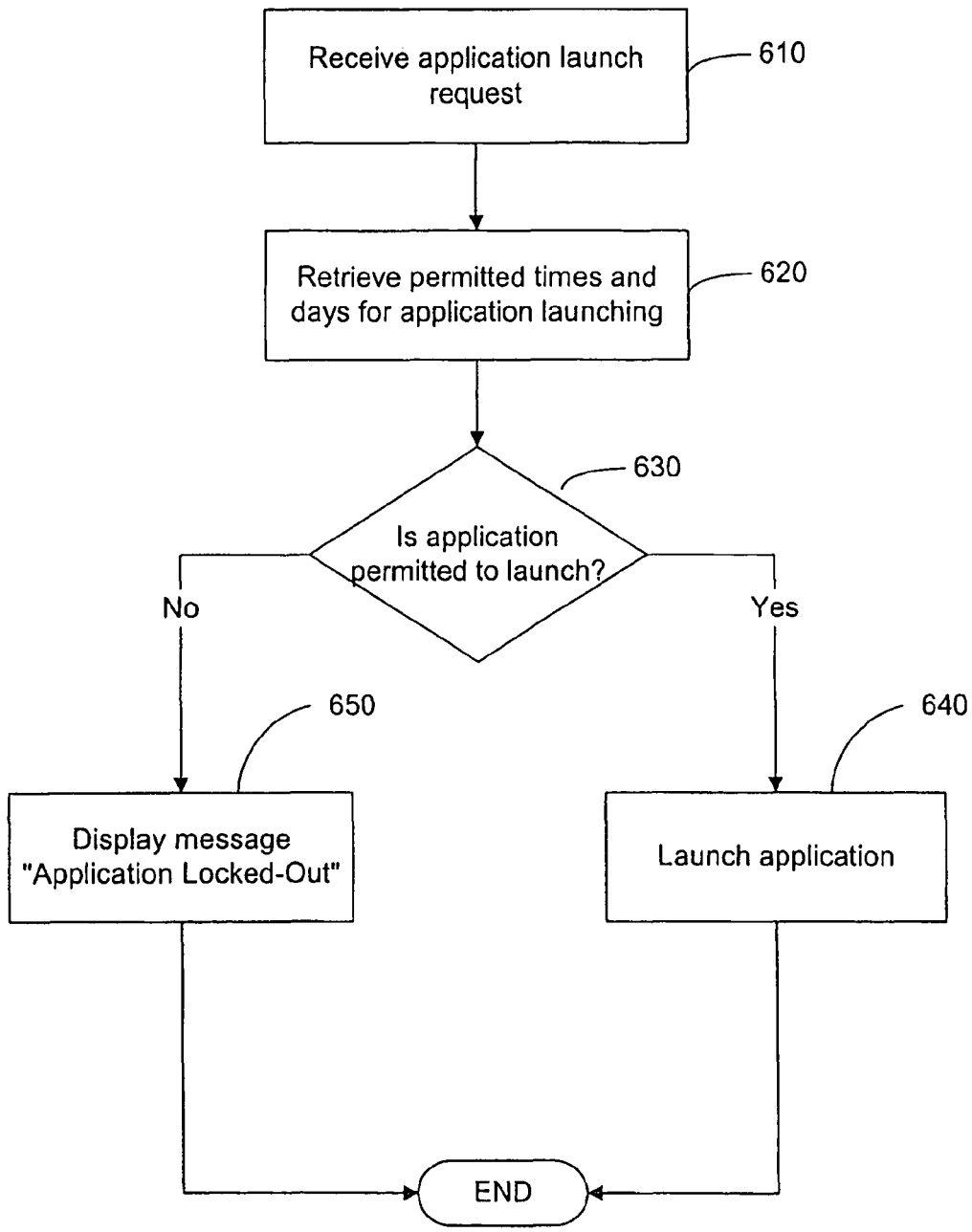
FIG. 6 shows a flow diagram of a parental control system for receiving an application launch request in an illustrative embodiment incorporating features of the present disclosure.

As illustrated in FIG. 6, the application or operating system that receives the request to launch the application first examines the data associated with that application 610. The application launcher retrieves the permitted times associated with the requested application 620 and compares the current time and date 630. The current time is provided through the handset's operating system or time and date data retrieved via Internet or WAP protocols. If the launcher determines that the application is outside of the permitted usage window the program will not run. Instead, the holder of the child device will be informed that the application (e.g. game) is locked-out for the time being 650. Otherwise the application will be launched 640. For instance, Amy's mother may approve using the web browser during the weekend and disallow its usage during the weekdays.

In another embodiment, the application list and associated lockout times are stored on a server. When the child handset attempts to run an application, the launcher program in the device first loads the application management data via Internet Protocol, WAP or other communication interfaces. It then checks the current time and date against this data to determine whether the parent device has locked out this application.

In yet another embodiment, a parent may reroute any unauthorized attempt to launch an application on the child device. If the rerouting option is set on the child device, the launching attempt is rerouted to the parent device as a form of communication message telling the parent that the child device is attempting to launch a given application.

In another embodiment, a parent may access a history log of authorized and unauthorized launching of applications on the child device. The parent would be able to see outgoing numbers that were connected, rejected, or rerouted and the corresponding times.

In yet another embodiment of controlling application launching, a parent may schedule the launching of an application for a specific purpose. From a web or phone interface, the parent can schedule automated SMS reminders or reminder phone calls. For instance, if the child has a piano lesson Wednesday after school, he gets a reminder weekly at 2:30 PM every Wednesday.

Although certain illustrative embodiments and methods have been disclosed herein, it will be apparent form the foregoing disclosure to those skilled in the art that variations and modifications of such embodiments and methods may be made without departing from the true spirit and scope of the art disclosed. Many other examples of the art disclosed exist, each differing from others in matters of detail only. For instance, Similarly, it will be apparent to one skilled in the art, that the wireless devices may be a cell phone or any other SMS enabled device. Thus the nature of the wireless network on which it runs is irrelevant as long as it enables communication among the wireless devices. Other communication protocols may be used such as Code Division Multiple Access wireless networks (CDMA) or Global System for Mobile networks (GSM, GSM/GPRS), Enhanced Data-Rates for GSM Evolution (EDGE) network, Universal Mobile Telecommunications Service (UMTS) network, Wideband Code Division Multiple Access (W-CDMA) network, Time Division Multiple Access (TDMA) network, iDen or any network offering SMS or data connections such as TCP/IP.

Likewise, custom SMS client(s) resident in the device may be implemented in any standard computing language such as C, C++, Java, Java 2 Micro Edition, Brew, SIM Toolkit or written for Symbian or other software platform.

Furthermore, rather than SMS transport, communication can be through TCP/IP, WAP (Wireless Application Protocol), WAP Push, HTTP or other e-mail, Internet or mobile communication protocols. Also, for applications that do not require a high level of security, the message transport could be sent directly between two handsets, rather than going through the intermediary message server.

Finally, it will also be apparent to one skilled in the art that control of the child device by a parent device may be applicable to other situations where usage control is necessary such as employer device controlling an employee device.

Accordingly, it is intended that the art disclosed shall be limited only to the extent required by the appended claims and the rules and principles of applicable law.

I claim:

1. A method of supervisory control of a wireless communication device by a supervisory control device, the method comprising:
   receiving an incoming phone call from an incoming communication source by the wireless communication device, wherein the phone call includes an incoming communication identifier;
   comparing the incoming communication identifier with the communication entity identifier in the list of communication entity identifiers;
   determining that the incoming communication identifier matches the communication entity identifier;
   rejecting the incoming phone call from the incoming communication source in response to the determining that the incoming communication identifier matches the communication entity identifier; and
   routing the incoming phone call from the incoming communication source for answering the phone call by the supervisory control device in response to the determining that the incoming communication identifier matches the communication entity identifier.

2. The method of claim 1, wherein the communication entity identifier is a telephone number.

3. The method of claim 1, wherein the communication entity identifier is an SMS address.

4. The method of claim 1, wherein the communication entity identifier is an e-mail address.

5. A wireless communication device for supervising by a supervisory, control device, the wireless communication device comprising:
   a software for enabling the wireless communication device to:
   receive an incoming phone call from an incoming communication source by the wireless communication device, wherein the phone call includes an incoming communication identifier;
   compare the incoming communication identifier with the communication entity identifier in the list of communication entity identifiers;
   determine that the incoming communication identifier matches the communication entity identifier;
   reject the incoming phone call from the incoming communication source in response to determining that the incoming communication identifier matches the communication entity identifier; and
   rout the incoming phone call from the incoming communication source for answering the phone call by the supervisory control device in response to determining that the incoming communication identifier matches the communication entity identifier.

6. The wireless communication device of claim 5, wherein the communication entity identifier is a telephone number.

7. The wireless communication device of claim 5, wherein the communication entity identifier is an SMS address.

8. The wireless communication device of claim 5, wherein the communication entity identifier is an e-mail address.

* * * * *